April 14, 1964 J. N. SAUNDERS 3,128,947
HEATING SYSTEMS

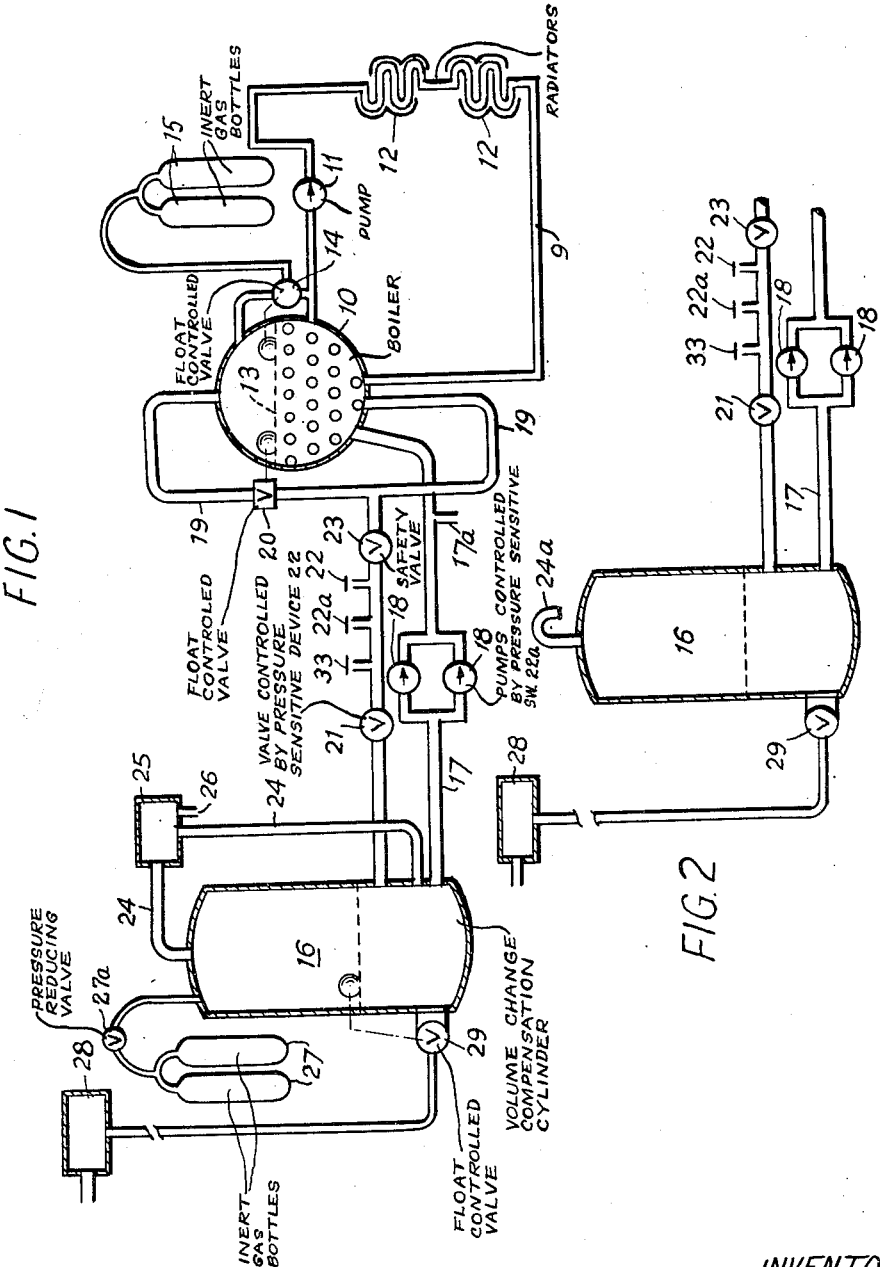

Filed Aug. 6, 1958 2 Sheets-Sheet 2

INVENTOR:
JACK NORMAN SAUNDERS
by
Frederick Breitenfeld
Attorney

United States Patent Office 3,128,947
Patented Apr. 14, 1964

3,128,947
HEATING SYSTEMS
Jack Norman Saunders, Wilmslow, England, assignor to Warmac Limited, a corporation of Great Britain and Northern Ireland
Filed Aug. 6, 1958, Ser. No. 753,549
Claims priority, application Great Britain Aug. 8, 1957
4 Claims. (Cl. 237—8)

This invention concerns heating systems of the type (hereinafter described as "the type referred to") which are pressurized to enable the circulating liquid medium, usually water, to be used at a temperature above its normal boiling point, i.e. its boiling point at atmospheric pressure. The liquid medium may be employed, for example, for space heating purposes or for an industrial process.

Control means is known (as described in my copending U.S. application No. 604,736, now Patent No. 2,960,272) for a heating system of the type referred to including closed high pressure container and low pressure containers, the high pressure container being adapted for connection to the external circuit of the heating system and to the low pressure container, means in connection between the high pressure and low pressure parts of the system adapted to allow flow of liquid on expansion thereof from the pressurised to the low pressure part of the system and means adapted to cause return flow of liquid on contraction thereof in the pressurised part, whereby a substantially constant liquid level and pressure may be maintained in the high pressure container over a desired range of operating temperatures.

The present invention is particularly concerned with such control means and has for its object to make their use more attractive, in both commercial and technical senses.

The invention is based on the appreciation that a flue-tube or shell-type boiler, which normally has a steam space within its shell, can be used as the high-pressure container in such a control system, whether or not the low pressure container is open to atmosphere or sealed and separately pressure controlled as in the earlier control means aforesaid.

Accordingly, the invention consists, in the broadest aspect, of a control system of the type referred to in which the high pressure container and heater are combined as a boiler-like heater such as a flue-tube or shell-type boiler, the liquid being adapted to cover the tubes, but leaving the equivalent of a steam space for maintaining gas pressure in said space for pressurisation.

The use, when putting the present invention into practice, of a so-called "packaged" boiler (that is a completely prefabricated boiler installation) is particularly advantageous. One reason is the commercial availability of such boilers, and another that they comprise a platform which can be utilized to carry the rest of the apparatus of the control system.

In the accompanying drawings:

FIG. 1 illustrates diagrammatically one example of a controlled heater system made in accordance with the invention;

FIG. 2 shows a modification of FIG. 1;

Figure 5:
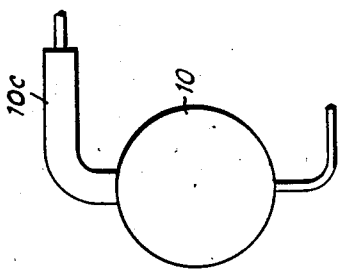
FIGS. 3, 4 and 5 are further diagrams showing modifications.

As shown in FIG. 1 the system comprises a horizontal tubular boiler 10 connected by a circuit 9 containing a circulating pump 11 to radiators 12. The normal water level is indicated by dotted line 13 and related thereto is a float-controlled valve 14 coupled to the boiler at points above and below said dotted line and to gas bottles 15 for maintaining pressurisation within the boiler. Adjacent the boiler is a volume change compensation cylinder 16 which is connected at its lower end through pipe 17 and alternative pumps 18 to the lower part of the boiler. An inlet connection 17a is provided for filling the system.

The upper and lower spaces in the boiler are connected by a balance pipe 19 through a float control valve 20. Connected into such pipe 19 below the valve 20 is a connection from the lower part of the cylinder 16 which includes a valve 21, a pressure-sensitive device 22 for actuating said valve and a pressure release safety valve 23. Pressure-responsive switches 22a and 33 are also included in the said connection. The cylinder 16 is closed and adapted to be isolated from the atmosphere whilst being maintained at approximately atmospheric pressure. For this purpose the upper and lower ends of the cylinder are connected by a pipe 24 through a pressure regulator 25 vented to atmosphere at 26; such pressure regulator preventing undue pressure rise. Gas such as nitrogen, is admitted through a suitable pressure reducing valve 27a from bottles 27. Make-up water for the cylinder 16 is provided from a tank 28 through a float-controlled valve 29 of known type.

Figure 6:
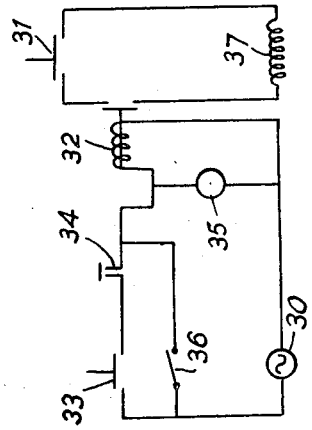
FIG. 6 is a circuit diagram.

As shown in the wiring diagram FIG. 6, the circuit, actuated from a source of electric power 30 includes a boiler-temperature control switch 31, a hand-reset solenoid switch 32, a pressure-responsive switch 33 normally open, a temperature responsive switch 34 normally closed and an alarm 35. A switch 36 is also shown for coupling to a magnetic float valve of known type if used at 20 (FIG. 1).

The coil 37 of the circuit represents a control relay for the boiler heating mechanism (not shown).

In operation, the system works as follows:

Assume that the water level in the boiler 10 and cylinder 16 are at normal as shown and that the heating system is being started from cold whilst gas pressure at 120 p.s.i.g. exists in the boiler 10 and at, say ¼ p.s.i.g. in the cylinder 16. As the temperature of the water rises in the boiler 10 and the heating circuit connected thereto, the water expands causing the level to rise slightly and raising the pressure in the gas volume of the upper part of the boiler. Such pressure rise operates to open the valve 21 through the pressure sensitive device 22. Consequently, the valve 21 operates continuously or intermittently to relieve the pressure caused by expansion so that the water level in the boiler falls or remains at normal until a fall of pressure causes or permits the valve 21 to close.

The water level in the cylinder 16 is originally determined by the float valve 29 but such level now rises as the volume of expansion enters from the boiler through the valve 21. Gas pressure in the cylinder 16 is prevented from rising by action of the regulator 25 which vents it at 26 to atmosphere.

Should the boiler temperature now fall, the gas pressure in the boiler falls and the pressure-responsive device 22a operates to start one of the pumps 18 (the other being a reserve pump) until the water level in the boiler is restored, simultaneously restoring the pressure in the boiler. Such release and return of expansion may occur as the boiler heating is shut off and turned on under thermostatic control.

Gas pressure will be maintained from falling below a predetermined level by replenishment from the gas bottles 15 under control of a normal pressure-reducing valve and the float valve 14. Should there be a gas leak or failure of the gas supply, an undue rise of level could be used to operate another float device and cause automatic shut down or other emergency action.

Should the level of water in the boiler fall unduly, there would be a danger of damage to the boiler tubes and if this occurred, the float switch 36 could come into operation to operate the alarm.

If the pressure in the boiler falls unduly, due to excessive loss of water or gas, while the temperature is still high (i.e. with switch 34 closed) then the pressure-responsive switch 33 will close to operate the alarm.

As shown in FIG. 2, the system is the same as shown in FIG. 1 with the omission of the pressure regulator 25 and its connecting pipe and replacement by a vent 24a, and the omission of the gas supply mechanism.

Figure 4:
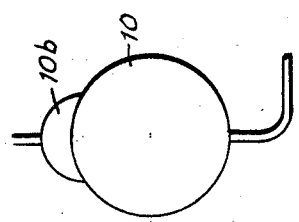
Figure 3:
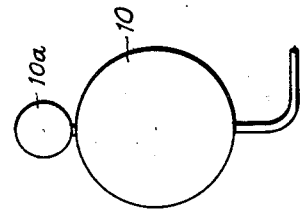

In control systems of the type with which this invention is concerned, the gas volume of the high pressure container must be related to the liquid capacity of the heating system to ensure that working pressure is reached before the working temperature and that the feed pump is not overworked by hunting. We are able to provide for adjustment of the gas volume to suit the nature of the heating system, as will often be necessary, since any given commercially available boiler, using the normal steam space as the gas space will only be suitable for use with a heating system of capacity within certain limits. Normally, however, it will be found that such space is adequate, but if the steam space of the boiler is too small, it can be increased, according to a still further feature of the invention, by mounting another smaller cylinder 10a (FIG. 3) above the boiler, connected thereto by suitable conduits or by mounting a dome 10b (FIG. 4) integrally to the boiler top. In single or multiple boiler installations, the necessary balance pipe 19 could be of increased diameter at its upper end to provide any desired additional volume without requiring another cylinder or dome. The space can, of course, always be reduced by adjustment of the liquid level to a height above that normally required to cover the tubes.

I claim:

1. A heating system of the type having a high pressure container and a heater characterised in that the system includes a boiler-like container having a liquid volume space and a gaseous volume space above it, heating means within said container for heating said liquid, and means for pressurizing said gas volume space sufficiently to prevent said liquid from boiling at the operating temperature of the system, said boiler-like container thereby constituting both the high pressure container and the heater of the system.

2. A heating system of the type comprising a high pressure container partially filled with a liquid heating medium such as water, a circulatory circuit for such medium, means within said container for heating said medium, means for maintaining a pressure of gas, such as nitrogen, in a gas space above said medium in said high pressure container to pressurise the circulatory circuit sufficiently to prevent said liquid medium from boiling at the operating temperature of the system, a volume-change container, means for releasing any expansion volume of the liquid collecting in the said high pressure chamber to said volume-change container whilst maintaining pressurisation in the high pressure container, means for returning the medium to the high pressure container to make-up any contraction volume of the medium.

3. A heater system comprising a boiler-like heater for a liquid heating medium such as water, a circulatory circuit for such medium, means within said boiler-like heater for heating said medium, means for maintaining a pressure of gas, such as nitrogen, in said boiler-like heater in a space above the said medium equivalent to a steam space to pressurize said liquid space sufficiently to prevent said medium from boiling at the operating temperature of the system, a low pressure container for liquid volume-change compensation, means for releasing to said low pressure container any expansion volume of the liquid collecting in the boiler-like heater whilst maintaining the gaseous pressure in the latter and means for returning the medium to the high pressure container to make-up any contraction volume of the medium.

4. In a heating system of the type comprising a high pressure container for holding a liquid heating medium, a circulatory circuit for such medium, means for introducing into a pressure space in said container above the medium a volume of gas under a predetermined pressure high enough to prevent said medium from boiling at the operating temperature of the system, a low pressure compensating tank connected to said container, means for releasing to said low pressure tank any expansion volume of the liquid collecting in said high pressure container, and means for returning the medium to said container from said tank to make-up any contraction volume of the medium, said two last-named means serving to maintain the medium level and the pressure in the space above the medium in said container at their respective predetermined values: the combination with all of the above elements of means for heating the medium, said heating means being disposed within said high pressure container below the level of the medium therein.

References Cited in the file of this patent

UNITED STATES PATENTS

| 2,522,373 | Jodell | Sept. 12, 1950 |
| 2,707,942 | Adams | May 10, 1955 |
| 2,740,588 | Bender | Apr. 3, 1956 |

FOREIGN PATENTS

| 1,141,588 | France | Mar. 18, 1957 |